United States Patent [19]

Chiu et al.

[11] 4,228,199

[45] Oct. 14, 1980

[54] COLD-WATER DISPERSIBLE, GELLING POTATO STARCH

[75] Inventors: Chung W. Chiu, Princeton; Morton W. Rutenberg, North Plainfield, both of N.J.

[73] Assignee: National Starch and Chemical Corporation, Bridgewater, N.J.

[21] Appl. No.: 54,860

[22] Filed: Jul. 5, 1979

[51] Int. Cl.$^2$ ............................................... A23L 1/187
[52] U.S. Cl. ................................... 426/578; 426/579; 426/661; 536/106
[58] Field of Search ............... 426/578, 579, 573, 661; 536/106; 127/33, 70

[56] References Cited

U.S. PATENT DOCUMENTS

| | | | |
|---|---|---|---|
| 2,328,537 | 9/1943 | Felton et al. | 127/33 |
| 2,754,232 | 7/1956 | Wetzstein et al. | 127/33 |
| 2,801,242 | 7/1957 | Kerr | 536/106 |
| 3,021,222 | 2/1962 | Kerr | 426/578 |
| 3,583,874 | 6/1971 | Germino | 426/578 |

*Primary Examiner*—Jeanette M. Hunter
*Attorney, Agent, or Firm*—Edwin Szala; Janet E. Hasak

[57] ABSTRACT

A cold-water dispersible, modified starch characterized by forming a gel having a Bloom strength of at least 60 grams is prepared by reacting a potato starch with a crosslinking agent to within defined Brabender viscosity limits sufficient to provide the modified starch with gelling properties and drum-drying the crosslinked starch to obtain the modified starch product. The starch may be optionally converted to a fluidity starch either before or after the crosslinking step and prior to drum drying. The gelling instant starch thus prepared is particularly useful in food systems of the type which gel upon standing, such as pie fillings, jellies, and puddings.

10 Claims, No Drawings

COLD-WATER DISPERSIBLE, GELLING POTATO STARCH

BACKGROUND OF THE INVENTION

I. Field of the Invention

The present invention relates to a cold-water dispersible, modified starch characterized by its gelling properties, and a process for its preparation. This invention also relates to food systems containing such a starch.

II. Description of the Prior Art

It is often desirable to prepare food systems which have a set or gel texture, such as pie fillings, puddings and jellies. Many types of food systems of this description contain gelling agents and must be cooked to effect gelation. Common gelling agents used in the past for this purpose are agar, gelatin, corn starch, pectin, carrageenin, algin and combinations of locust-bean gum and xanthan gum. In addition, starches derived from, e.g., corn, potato, tapioca, and wheat which are acid-converted to a certain water fluidity level will retrograde to a gel when cooked.

An example of a food product which requires cooking to effect gelation is the conventional starch-based pudding, which generally consists of an ungelatinized starch, flavorings, sweetening agents, etc. Such puddings are prepared for consumption by adding milk, cooking until the starch is gelatinized, pouring the cooked mixture into a bowl or individual serving dishes, and cooling and/or refrigerating.

There are, however, certain disadvantages associated with food systems of this type. In addition to the fact that cooking of the food system is necessary to impart the gel texture thereto, many of the gelling agents used in these systems require specific conditions. Thus, for example, gelatin can be used only after dissolution in very hot water, and typical pectins for use in jellies require about 65% sugar solids to produce a gel.

The remaining types of known food systems which have a set or gel texture form a gel without cooking. Most of these products are milk-based and consist of pregelatinized (i.e., cold-water dispersible) starch, one or more setting agents, which are usually phosphate salts (e.g., tetrasodium pyrophosphate), and flavoring, sweetening, and coloring agents. The set or gel properties of these food systems are obtained from the interaction of the phosphate salts with the casein and calcium ion provided by the milk, and not with the starch ingredient in the formulation. The pregelatinized starch functions as a viscosity builder or thickening agent, but is not the prime factor in the development of the gel structure of the prepared food system.

The major drawback of these uncooked, so-called "instant", food formulations is that they do not have the firm gel structure of the cooked formulations, i.e., they do not cut as cleanly with a spoon; and their texture, rather than being smooth, is generally described as "grainy" in both appearance and "mouth-feel" characteristics. Moreover, the setting salts are not operative at low pH or in non-milk-based food systems.

U.S. Pat. No. 3,583,874 discloses a starch composition suitable as gelling agent in instant puddings, which comprises a blend of a pregelatinized, defatted starch and a granular, preswollen starch having a water fluidity in a certain range.

A cold-water dispersible, modified tapioca starch which forms a gel when dispersed in cold water is taught in U.S. application Ser. No. 1,720 filed Jan. 8, 1979 to Chung-Wai Chiu et al. This starch product is obtained by drum drying a tapioca starch which has been converted to a specified water fluidity and reacted with a crosslinking agent to give Brabender viscosity parameters within a selected range. It is taught herein that if the starch is simply crosslinked and drum dried without having been converted to a fluidity starch, a product having gelling properties is not obtained.

Accordingly, it is an object of the present invention to provide a cold-water dispersible, modified potato starch as one component which forms a gel when dispersed in cold water without the necessity for conversion of the starch.

It is another object to provide a good system, e.g., a pie filling or jelly formulation, containing a cold-water dispersible gelling potato starch.

SUMMARY OF THE INVENTION

The above and related objects are achieved by a cold-water dispersible, modified potato starch with gelling properties, prepared by drum-drying a potato starch which has been reacted with a crosslinking agent such that the crosslinked starch has a Brabender Viscosity Differential, measured between 80° and 95° C., of from about −35 to +180%, measured at 5% solids using a 700 cm.-g. cartridge, and has a Brabender viscosity at 80° C. of up to about 3100 B.U., measured at 5% solids, or of from about 800 to 1400 B.U., measured at 7% solids, using a 700 cm.-g cartridge, said crosslinked starch after drum-drying being capable of forming a gel having a Bloom strength of at least 60 grams.

The step of converting the starch to a certain water fluidity before or after crosslinking is not necessary in the process herein; however, the potato starch may be converted to a water fluidity of up to about 60 prior to the crosslinking step, or converted after the crosslinking step, if desired.

The product obtained by merely crosslinking and drum drying the potato starch is comparable in properties to the tapioca starch product obtained by U.S. application Ser. No. 1,720 mentioned above. Thus, it forms a gel at low as well as high pH without the need for setting salts, is effective as a gelling agent in a non-milk-based food system, and is capable of forming a gel with or without the addition of sugar thereto.

The present modified starch is useful in any food formulations where a starch which will gel without further cooking is desired, and is particularly suited for use in pie and cream fillings, puddings, spreads, jellies, and instant mixes of the type which are reconstituted with water or milk and allowed to set at room temperature or lower. A food system containing such a starch will have properties, e.g., texture, appearance, gel structure, and flavor, which closely resemble those of a food formulation which is cooked.

DESCRIPTION OF THE PREFERRED EMBODIMENTS

The starch base employed in the present invention is potato starch, which, as used herein, refers to potato starch in its intact granular form which is either raw or has been converted to a water fluidity of up to about 60. As used herein, the term "water fluidity" has a very specific meaning and is defined and measured as described further hereinbelow. If the water fluidity of the starch is greater than about 60, a product giving a set or stable texture will be obtained, with no gel formation. If the starch is to be converted to a fluidity starch either prior or subsequent to the crosslinking step and prior to the drum-drying step, any suitable method of degradation may be employed which results in the modified starch defined herein, such as mild acid hydrolysis with an acid such as, e.g., sulfuric or hydrochloric acid, conversion with hydrogen peroxide or enzyme conversion, etc. In a preferred embodiment, the starch is acid-converted prior to crosslinking to a water fluidity of 20-50.

In the preparation of the present modified starch, the potato starch is reacted with any crosslinking agent capable of forming linkages between the starch molecules. Typical crosslinking agents suitable herein are those approved for use in foods such as epichlorohydrin, linear dicarboxylic acid anhydrides, acrolein, phosphorus oxychloride, and soluble metaphosphates; however, other known crosslinking agents such as formaldehyde, cyanuric chloride, diisocyanates, divinyl sulfone, and the like may also be used if the product is not to be used in foods. Preferred crosslinking agents are phosphorus oxychloride, epichlorohydrin, sodium trimetaphosphate (STMP), and adipic-acetic anhydride (1:4), and most preferably phosphorus oxychloride.

The crosslinking reaction itself is carried out according to standard procedures described in the literature for preparing crosslinked, granular starches such as that of, e.g., U.S. Pat. Nos. 2,328,537 and 2,801,242. The exact reaction conditions employed will, of course, vary with the type of crosslinking agent used, as well as the type of starch base, the reaction scale, etc. The reaction between starch and crosslinking agent may be carried out in aqueous medium, which is preferred, in which case the starch is slurried in water and adjusted to the proper pH, and the crosslinking agent added thereto.

The crosslinking reaction may be carried out at a temperature of 5°-60° C., and preferably 20°-40° C. It will be recognized that use of temperatures above about 60° C. will be undesirable for this purpose, since granule swelling and filtration difficulties or gelatinization of the starch may result therefrom; and the starch must retain its granular form until it is drum-dried. Reaction time will vary depending mainly on the crosslinking agent and temperature used, but is typically about 0.2-24 hours.

After the crosslinking reaction is complete, the pH of the reaction mixture is generally adjusted to 5.5-6.5, using a common acid. The granular reaction product may be recovered by filtration and washed with water and dried prior to drum drying. However, such a washing step is not necessary for purposes herein, and the crosslinked product may be drum-dried or converted directly without isolation thereof.

The amount of crosslinking agent necessary to give a product having the characteristics defined herein will vary depending, for example, on whether the starch has been converted, the type of drum drying employed, the type of crosslinking agent employed, the concentration of the crosslinking agent, the reaction conditions, and the necessity for having a crosslinked starch which falls within a specified range of crosslinking as determined by its viscosity characteristics. It will be recognized by the practitioner that it is not the amount of crosslinking agent which is added to the reaction vessel that determines the properties of the final product, but rather the amount of reagent which actually reacts with the starch, as measured by the Brabender viscosities. The best parameters which define the products herein having the specified minimum gel strength are the Brabender viscosity and the Brabender Viscosity Differential (BVD), the latter being defined as follows:

$$V_{95} - V_{80}/V_{80} \times 100$$

wherein $V_{95}$ and $V_{80}$ are the Brabender viscosities of the starch at 95° and 80° C., respectively. The BVD, which is expressed in percentage units, may be a positive or negative value, depending on whether the Brabender viscosity increases or decreases, respectively, as the temperature is raised. It is a particularly useful parameter for defining the converted, crosslinked starches herein, since the viscosity itself is very dependent on the water fluidity of the starch. The Brabender Viscosity Differential of the crosslinked starch, whether converted or not, may vary broadly from about −35 to +180%, measured at 5% solids using a 700 cm.-g. cartridge. It will be understood by the practitioner that not all of the values within the above-mentioned BVD range will be operable for all the starches falling within the scope of this invention. The appropriate BVD must be determined separately for each conversion level and for the drum drier to be employed.

In order that the gelling instant starch herein will be obtained, not only must the BVD of the crosslinked starch be within a narrowly defined range, but also the Brabender viscosity of this starch as measured at 80° C. must be within a certain range which depends on the solids level used for measurement thereof. Thus, the Brabender viscosity at 80° C. must be up to about 3100 B.U. when measured at 5% solids using a 700 cm.-g. cartridge, and must be about 800 to 1400 B.U. when measured at 7% solids using the same cartridge. It will be recognized that some of the crosslinked starches herein will have a Brabender viscosity at 80° C. which falls within both of the ranges specified for the viscosity. Making measurements at two different percent solids levels to obtain both the BVD and viscosity values was found necessary to define the converted and crosslinked starches to increase sensitivity and accuracy in taking into account differences in water fluidity.

When the starch is converted before crosslinking, the optimal BVD, to be strictly accurate, should be determined for each starch of a given water fluidity level and for the particular drum drier to be employed. When the laboratory single-drum drier described hereinafter and employed in most of the examples is used, a general relationship between workable water fluidity ranges and Brabender viscosity data, based on experimental results, can be expressed as follows:

| Water Fluidity Range | Brabender Viscosity Differential (BVD) Range (%) |
|---|---|
| 10-30 | −30 to +100[a] |
| 31-40 | −30 to +5[b] |
| 41-60 | −15 to +5[b] |

[a]Viscosity based on 700 cm.-g. cartridge at 5% solids.
[b]Viscosity based on 700 cm.-g. cartridge at 7% solids.

The above table may serve as a guideline for obtaining starches with gelling properties; however, BVD numbers slightly higher or lower than those specified may still give an acceptable gel within a particular water fluidity range. It is noted that the above guidelines were obtained based on data from the laboratory single-drum drier, and are not necessarily applicable to drum driers of a different type (e.g., having higher shear). Thus, for example, when a commercial drum drier is employed, different relationships between water fluidity and BVD may be observed. The practitioner is reminded that the actual numbers specified vary in a sensitive way with the crosslinking agent and drum drier used, the method of conversion, etc.; and that the most important criterion in defining the starch product herein is that it have the gelling properties specified hereinbelow.

The crosslinked starch, whether it has been converted or not, must be pregelatinized to become cold-water dispersible. The pregelatinization is accomplished herein by using a suitable drum drier, having a single drum or double drums, to dry the starch to a moisture level of about 12% or less. The starch slurry is typically fed onto the drum or drums through a perforated pipe or oscillating arm from a tank or vat provided with an agitator and a rotor.

The water fluidity and crosslinking levels specified above are interdependent, but they also vary to some degree with the drum drier employed. It has been found that drum driers which produce higher shear than a laboratory single-drum drier (such as a commercial single-drum drier) require that the starch have a higher level of crosslinking to obtain the present modified starch with its gelling properties. Without limitation to any one theory, it is postulated that the unique gelling properties of the products herein are related to the release of amylose during drum drying. The conversion of the starch alters the starch granule to control the size of the amylose and the amylose release; and the crosslinking, also a factor in amylose release, increases resistance of the granules to shearing breakdown on the drum drier. Thus, drum driers with higher shear possibly tend to disrupt the granules to a greater extent, liberating more amylose at a faster rate, which amylose then retrogrades on the drum. If, however, the starch is more highly crosslinked, it will resist this disruption and can be successfully drum-dried using higher-shear apparatus without an adverse effect on its gelling properties.

After drying, the starch product is removed from the drum drier in sheet form and then pulverized to a powder. Alternatively, the product may be reduced to flake form, depending on the particular end-use, although the powdered form is preferred. Any conventional equipment such as a Fitz mill or hammer mill may be used to effect suitable flaking or pulverizing.

The final product obtained from the drum-drying operation is a cold-water dispersible starch which forms a gel when dispersed in water. The determination of gel formation and the measurement of gel strength are accomplished by subjective evaluation and by Bloom Gelometer readings. These two methods of measurement are not always consistent (due in part to the cohesiveness of some of the products), but for purposes herein, the present modified starch must form a gel having a Bloom strength (as defined herein) of at least 60 grams, and preferably at least 100 grams.

In the examples which follow, all parts and percentages are given by weight and all temperatures in degrees Centigrade unless otherwise indicated.

The following analytical and testing procedures are used in the examples to characterize the starch products herein.

A. Water Fluidity Measurement

The water fluidity of converted potato starch is measured by using a Thomas Rotational Shear-Type Viscometer (manufactured by Arthur H. Thomas Co., Philadelphia, Pa. 19106), standardized at 30° C. with a standard oil having a viscosity of 24.73 cps. which oil requires 23.12±0.05 sec. for 100 revolutions. As conversion of the starch increases, the viscosity of the starch decreases. Accurate and reproducible measurements of the water fluidity are obtained by determining the time which elapses for 100 revolutions at different solids levels depending on the degree of conversion of the starch. The general procedure is as follows: The required amount of starch (e.g., 6.16 g. dry basis) is slurried in 100 ml. of distilled water in a covered copper cup, and the slurry heated in a boiling water bath for 30 min. with occasional stirring. Then, the starch solution is brought to the final weight (e.g., 107 g.) with distilled water. The time required for 100 revolutions of the resultant solution at 81°–83° C. is recorded and converted to a water fluidity number as defined in the table below:

| Amount of Starch Used (anhydrous, g.): | | | | |
|---|---|---|---|---|
| $6.16^a$ | $8.80^b$ | $11.44^c$ | $13.20^d$ | |
| Time required for 100 revolutions (sec.) | | | | Water Fluidity |
| 39.6 | | | | 10 |
| 29.3 | | | | 15 |
| 22.6 | | | | 20 |
| 20.2 | | | | 25 |
| | 33.4 | | | 30 |
| | 27.4 | | | 35 |
| | 22.5 | | | 40 |
| | | 32.5 | | 45 |
| | | 26.8 | | 50 |
| | | 22.0 | | 55 |
| | | | 24.2 | 60 |
| | | | 19.2 | 65 |
| | | | 15.9 | 70 |

$^a$Final weight of starch solution = 107 g.
$^b$Final weight of starch solution = 110 g.
$^c$Final weight of starch solution = 113 g.
$^d$Final weight of starch solution = 115 g.

B. Brabender Evaluation

The crosslinked starch to be tested is slurried in a sufficient amount of distilled water to give 500 g. of slurry containing 25.0 g. (for 5% solids) or 35.4 g. (for 7% solids) of anhydrous starch solids. The slurry is then poured into the Brabender cup, and the viscosity is measured using a VISCO/Amylo/GRAPH (manufactured by C. W. Brabender Instruments, Inc., Hackensack, N.J.) as follows: The starch slurry is rapidly heated to 50° C. and then heated further from 50° to 95° C. at a heating rate of 1.5° C. per minute. The viscosity readings at 80° C. and at 95° C. are recorded.

C. Gelling Evaluation

A total of 7.0 g. of starch sample (the crosslinked starch after drum drying) and 20.0 g. of sugar are dry-mixed by shaking in a 4-oz. (118-ml.) jar. This dry mixture is added slowly to 100 ml. distilled water while mixing in a Sunbeam Mixmaster (trademark) Kitchen Mixer at speed #2 for a period of one minute. The resulting mixture is then poured into a 4-oz. (118-ml.) jar and placed in a refrigerator (at 15° C.) for about 16 hours. After this period, the mixture is removed from the refrigerator and allowed to stand at room temperature for about 0.5 hours. The sample is evaluated for Bloom strength using a Bloom Gelometer (Precision Scientific Co., Chicago, Ill.) with a 1-in. (2.54-cm.)-diameter plunger. The gel is additionally evaluated by hand by inverting the jar and removing the sample, noting whether the form is retained. The sample is judged by degrees as being stable (fluid), a set (retains its form as lumps, but when stirred, becomes fluid), weak gel (retains some form and is able to be cut, but is only a soft gel), medium gel (retains more of its form), or strong gel (retains complete form and cuts cleanly). The relationship between Bloom strength and hand evaluation is not always consistent, but as somewhat of a guideline, the following approximate correlation can be made:

| Bloom Strength (g.) | Description of Gel |
|---|---|
| 100 or more | strong gel |
| 90–100 | medium to strong gel |
| 75–90 | medium gel |
| 60–75 | weak gel or set |

It is to be noted that in some cases the Bloom strength of a weak or very weak gel cannot be measured. Hence, to evaluate a gel accurately one should take into account both the Bloom strength and the visual description thereof.

EXAMPLE I

This example illustrates the preparation of the modified potato starch in accordance with the present process.

The starches designated as Starch Sample Nos. 1–8 in Table I were prepared as follows: A total of 200 g. of a raw potato starch having a peak Brabender viscosity of 1550 was slurried in 250 ml. water containing 1.0 g. sodium chloride and 1.2 g. sodium hydroxide. Thereafter, with good agitation, reagent-grade phosphorus oxychloride ($POCl_3$, b.p. 105°–108° C., d=1.675) was added in the amount given (12 ul.=0.005% by weight on starch having normal moisture content; 48 ul.=0.02%, etc.); and the mixture was allowed to react at a temperature of about 22°–27° C. for two hours. After reaction was complete, the mixture was neutralized with dilute hydrochloric acid (1 part 36.5–38% HCl to 3 parts water) to pH 5.5–6.5, filtered, washed and dried.

Each starch sample indicated in Table I was evaluated for Brabender viscosity by the above-described test procedure using a 700 cm.-g. cartridge at 5% anhydrous solids. Then, each sample was drum-dried by slurrying 200 g. starch in 300 ml. water and drying the slurry on a steam-heated steel drum, with steam pressure of 105–110 psi. (7.38–7.73 kg./cm.²), having the following specifications:

|  | Speed (RPM) | Length in. (cm.) | Temperature °F. (°C.) | Diameter in. (cm.) |
|---|---|---|---|---|
| Feed Roller | 52.86 | 10 (25.4) | — | 2 (5.1) |
| Drum | 5.08 | 10 (25.4) | 287–293 (142–145) | 10 (25.4) |

The pregelatinized starch sheets thus obtained were then pulverized using a laboratory pulverizing mill (#008 screen), manufactured by Weber Brother Metal Works, Chicago, Ill.

The dried starch products were evaluated as to their gelling properties by the Bloom strength and hand-evaluation tests above described, and the results are given in Table I. Some inconsistencies in the hand and Bloom gel strength tests occur, but, in general, as the Bloom strength value increases, a stronger gel is observed. If the raw potato starch is drum-dried without being crosslinked, no gel is obtained.

EXAMPLE II

This example illustrates the use of different crosslinking agents to prepare the modified starch herein.

A. Sodium Trimetaphosphate (STMP): (Sample Nos. 9–10)

A total of 300 g. of raw potato starch was slurried in 375 ml. water containing 1.5 g. sodium chloride and 1.8 g. sodium hydroxide. STMP was then added in the amount indicated in Table II. After stirring for 16 hours at room temperature, the mixture was neutralized with dilute hydrochloric acid (prepared by mixing one part of 10% HCl with three parts of water) to pH 5.5–6.5, filtered, washed, and air-dried.

TABLE I

| Starch Sample No. | $POCl_3$ (% on starch as is) | Brabender Viscosity (B.U.)[a] 80° C. | Brabender Viscosity (B.U.)[a] 95° C. | BVD (%) | Gel Evaluations Bloom Strength (g.) | Gel Evaluations Hand Evaluation |
|---|---|---|---|---|---|---|
| Raw potato starch (as control) | — | — | — | — | — | stable |
| 1 | 0.001 | 1580 | 1020 | −35.4 | — | set |
| 2 | 0.002 | 1860 | 1350 | −27.4 | 68 | weak gel |
| 3 | 0.005 | 2210 | 1750 | −20.8 | 73 | weak gel |
| 4 | 0.010 | 2240 | 2130 | −4.9 | 89 | medium gel |
| 5 | 0.015 | 530 | 825 | +55.7 | 219 | strong gel |
| 6 | 0.020 | 300 | 550 | +100.0 | 204 | strong gel |
| 7 | 0.030 | 470 | 750 | +59.6 | 185 | strong gel |
| 8 | 0.040 | 100 | 230 | +130.0 | 170 | medium gel |

[a]Measured using a 700 cm.-g cartridge at 5% solids.

B. Epichlorohydrin: (Sample Nos. 11–12)

A total of 300 g. of raw potato starch was slurried in 375 ml. water containing 1.8 g. sodium hydroxide, 3.0 g. sodium chloride and 0.3 g. calcium chloride. The epichlorohydrin was added in the amount given in Table II as a 1% aqueous solution and allowed to react in a jar by tumbling. After 16 hours, the mixture was neutralized and the starch isolated as described above.

C. Adipic-Acetic Mixed Anhydride: (Sample Nos. 13–14)

A total of 300 g. of raw potato starch was slurried in 375 ml. water and the pH was adjusted to 8 with 3% sodium hydroxide solution. Then, mixed anhydride (prepared by gradually heating a mixture of one part adipic acid and four parts acetic anhydride to 90° C. over a period of one hour and holding at 90° C. for one hour) was added slowly in the amounts indicated in Table II, with the pH controlled at 8 with 3% sodium hydroxide solution. After completion of addition, the mixture was allowed to stir for an additional 15 minutes, and was then neutralized and isolated as described above.

Each of the crosslinked products prepared as above (A, B, and C) was evaluated for Brabender viscosity, then drum-dried, and measured for gel properties as previously described. The results are given in Table II. It can be seen from the data that crosslinking agents other than phosphorus oxychloride may be used to obtain gels within the limits prescribed herein.

EXAMPLE III

This example illustrates the optional procedure for conversion of starch to a water fluidity level before the crosslinking reaction.

A total of 2000 g. of raw potato starch was stirred into 3000 ml. of distilled water and heated in a bath to 50° C.

Then, 16.0 g. of concentrated sulfuric acid was added and the mixture stirred at 50° C. for 16.5 hours. The hydrolysis was stopped by neutralizing the mixture with 3% sodium hydroxide solution to a pH of 5.5–6.5. The slurry was then filtered, washed, and dried. The water fluidity of the thus-recovered starch, designated hereinbelow as Starch Sample No. 15, was found to be 10.0, as measured by the test procedure above described.

EXAMPLE IV

This example illustrates the preparation of several converted starches having a range of water fluidities of from 23 to 63.

Starch Sample Nos. 16–20 designated in Table III were prepared using the procedure of Example III, varying the amounts of starch, water and acid, and reacting for 17.5 hours instead of 16.5 hours. The water fluidity (W.F.) of each starch obtained was determined as in Example III, and the results given in Table III. It is noted that a given degree of conversion can be obtained in shorter reaction times than those used herein when higher concentrations of acid and/or higher temperatures below the gelatinization temperature are employed.

TABLE II

| Starch Sample No. | Amount of STMP (% by weight on starch as is) | Amount of Epichlorohydrin (% by weight on starch as is) | Amount of Adipic-Acetic Anhydride (% by weight on starch as is) | Brabender Viscosity (B.U.)$^a$ 80° C. | Brabender Viscosity (B.U.)$^a$ 95° C. | BVD (%) | Gel Evaluations Bloom Strength (g.) | Gel Evaluations Hand Evaluation |
|---|---|---|---|---|---|---|---|---|
| 9 | 0.10 | — | — | 2065 | 2300 | +11.4 | 135 | strong gel |
| 10 | 0.15 | — | — | 1880 | 2180 | +16.0 | 154 | strong gel |
| 11 | — | 0.020 | — | 850 | 1260 | +48.0 | 207 | strong gel |
| 12 | — | 0.025 | — | 375 | 670 | +79.0 | 152 | medium gel |
| 13 | — | — | 0.25 | 2450 | 1870 | −18.0 | 66 | weak gel |
| 14 | — | — | 0.30 | —$^b$ | —$^b$ | —$^b$ | 98 | medium gel |

$^a$Measured using a 700 cm.-g. cartridge at 5% solids.
$^b$Not determined.

TABLE III

| Starch Sample No. | Water Fluidity | Amount of Starch (g.) | Amount of Water (g.) | Amount of Acid (g.) |
|---|---|---|---|---|
| 16 | 23 | 2000 | 3000 | 20.0 |
| 17 | 35 | 2000 | 2500 | 25.0 |
| 18 | 46 | 2000 | 2500 | 30.0 |
| 19 | 55 | 2500 | 3750 | 50.0 |
| 20 | 63 | 2500 | 3750 | 62.5 |

EXAMPLE V

This example illustrates crosslinking and drum drying of converted potato starch to obtain the gelling instant starch herein.

The starches designated as Sample Nos. 21–40 in Table IV were prepared by the procedure outlined in Example I using Starch Sample Nos. 15–20 instead of raw potato starch. Brabender measurements were not taken for every sample but for various representative samples. Each product was evaluated as to its gelling properties. It can be seen from the results that when the water fluidity is greater than about 60, or when the starch is not crosslinked or is outside the specified BVD range, the resultant products do not have gelling properties. The interdependent relationship of the water fluidity of the starch to its BVD and viscosity at 80° C. is evident from the data.

EXAMPLE VI

This example illustrates the process of Example V wherein the converting and crosslinking steps are reversed.

The starches designated as Sample Nos. 41–44 in Table V were prepared as follows: A total of 1000 g. of raw potato starch was slurried in 1250 ml. of distilled water containing 5.0 g. sodium chloride and 6.0 g. sodium hydroxide. Reagent-grade phosphorus oxychloride was then added with stirring in the given amount and the mixture was allowed to react at room temperature (24° C.) for two hours. The mixture was thereafter neutralized with dilute hydrochloric acid to pH 5.5–6.0 and the samples to be hydrolyzed were placed in a water bath at 45° C.

To each slurry was added 18 g. (2% by weight on starch as is) of concentrated hydrochloric acid. Samples were removed from the bath after 3 or 5.5 hours of hydrolysis and then neutralized with dilute sodium hydroxide to pH 5.5–6.0, filtered washed and dried.

TABLE IV

| Starch Sample No. | W.F. of Starch Base | POCl$_3$ (% on Starch as is) | Brabender Viscosity (B.U.) 80° C. | Brabender Viscosity (B.U.) 95° C. | Cartridge No./Percent Solids | BVD (%) | Gel Evaluations Bloom Strength (g.) | Gel Evaluations Hand Evaluation |
|---|---|---|---|---|---|---|---|---|
| 15$^a$ | 10 | — | —$^b$ | —$^b$ | — | —$^b$ | —$^c$ | stable |
| 21 | " | 0.025 | 900 | 790 | 700/5 | −12.2 | 229 | strong gel |
| 22 | " | 0.050 | 700 | 835 | 700/5 | +19.3 | 205 | strong gel |
| 23 | " | 0.060 | 505 | 710 | 700/5 | +41.0 | 320 | strong gel |
| 16$^a$ | 23 | — | —$^b$ | —$^b$ | — | —$^b$ | —$^c$ | stable |
| 24 | " | 0.010 | 420 | 270 | 700/5 | −35.7 | 98 | set |
| 25 | " | 0.020 | 615 | 470 | 700/5 | −23.6 | 142 | weak gel |
| 26 | " | 0.060 | 1540 | 1710 | 350/5$^d$ | +11.0 | 276 | strong gel |

TABLE IV-continued

| Starch Sample No. | W.F. of Starch Base | POCl₃ (% on Starch as is) | Brabender Viscosity (B.U.) 80° C. | Brabender Viscosity (B.U.) 95° C. | Cartridge No./Percent Solids | BVD (%) | Gel Evaluations Bloom Strength (g.) | Gel Evaluations Hand Evaluation |
|---|---|---|---|---|---|---|---|---|
| 27 | " | 0.090 | 465 | 740 | 350/5[d] | +59.0 | 253 | strong gel |
| 28 | " | 0.125 | 20 | 35 | 350/5[d] | +75.0 | 114 | medium to strong gel |
| 17[a] | 35 | — | —[b] | —[b] | — | —[b] | —[c] | stable |
| 29 | " | 0.035 | 840 | 585 | 700/7 | −30.4 | 161 | weak to medium gel |
| 30 | " | 0.045 | 1300 | 1110 | 700/7 | −14.6 | 206 | medium to strong gel |
| 31 | " | 0.100 | 1105 | 1180 | 700/7 | +6.8 | 99 | set |
| 18[a] | 46 | — | —[b] | —[b] | 0— | —[b] | 53 | stable |
| 32 | " | 0.050 | 980 | 845 | 700/7 | −13.8 | 95 | set |
| 33 | " | 0.070 | 1260 | 1160 | 700/7 | −7.9 | 180 | medium to strong gel |
| 34 | " | 0.150 | 1315 | 1120 | 700/7 | −14.8 | 144 | weak to medium gel |
| 19[a] | 55 | — | —[b] | —[b] | — | —[b] | —[c] | stable |
| 35[a] | " | 0.050 | 710 | 525 | 700/7 | −26.1 | 62 | stable |
| 36 | " | 0.100 | 1200 | 1075 | 700/7 | −10.4 | 145 | medium to strong gel |
| 37 | " | 0.150 | 1200 | 1230 | 700/7 | +2.5 | 109 | weak gel |
| 20[a] | 63 | — | —[b] | —[b] | — | —[b] | 48 | stable |
| 38 | " | 0.100 | 1150 | 1030 | 700/7 | −10.4 | 74 | set |
| 39[a] | " | 0.150 | 1245 | 1180 | 700/7 | −5.2 | 75 | stable |
| 40[a] | " | 0.200 | —[b] | —[b] | — | —[b] | 55 | stable |

[a]These examples are outside the scope of the invention and are included for comparison purposes.
[b]Viscosity not determined.
[c]Bloom strength is not measurable.
[d]A 350 cm.-g. cartridge at 5% solids yields a Brabender viscosity twice that of a 700 cm.-g. cartridge at 5% solids.

TABLE V

| Starch Sample No. | POCl₃ (% on starch as is) | Hydrolysis (hours) | Brabender Viscosity (B.U.)[a] 80° C. | Brabender Viscosity (B.U.)[a] 95° C. | BVD (%) | Gel Evaluations Bloom Strength (g.) | Gel Evaluations Hand Evaluation |
|---|---|---|---|---|---|---|---|
| 41 | 0.0125 | 3.0 | 1630 | 1490 | −8.6 | 193 | strong gel |
| 42 | " | 5.5 | 1200 | 1000 | −16.7 | 256 | strong gel |
| 43 | 0.0250 | 3.0 | 1835 | 1830 | −0.3 | 267 | strong gel |
| 44 | " | 5.5 | 1545 | 1460 | −0.1 | 311 | strong gel |

[a]Measured using a 700 cm.-g. cartridge at 5% solids.

The Brabender viscosity values of each sample were measured, and the data are summarized in Table V.

Each sample was then drum-dried at 40% solids on a drum drier as described in Example I. The gel strengths of each sample are indicated in Table V.

EXAMPLE VII

This example illustrates the effect of a different drum drier on gel formation of the starch herein.

Starch Sample A in Table VI was prepared as in Example I using 0.015% by weight of phosphorus oxychloride on starch as is. The Brabender viscosity of the sample was measured and found to be 3000 B.U. at 80° C. and 2590 B.U. at 95° C., measured using a 700 cm.-g. cartridge at 5% solids, to give a BVD of −0.1%.

Starch Sample B in Table VI was prepared as in Example V by reacting Starch Sample No. 16 with 0.05% phosphorus oxychloride on starch as is. The Brabender viscosity of this sample was 995 B.U. at 80° C. and 905 B.U. at 95° C., measured using a 700 cm.-g. cartridge at 5% solids, to give a BVD of −0.1%.

Each starch sample was dried on a laboratory double-drum drier with specifications as follows:

| Speed RPM) | Length ft. (cm.) | Temperature °F. (°C.) | Diameter ft. (cm.) | Steam Pressure psi (kg./cm.²) |
|---|---|---|---|---|
| 5 | 1.5 (45.7) | 295–310 (146–154) | 1 (30.5) | 95 (6.68) |

Each starch was evaluated for gel strength, and the results are indicated in Table VI.

TABLE VI

| Starch Sample | Gel Evaluations Bloom Strength (g.) | Gel Evaluations Hand Evaluation |
|---|---|---|
| A | 151.0 | very strong gel |
| B | 260.6 | very strong gel |

EXAMPLE VIII

This example illustrates the preparation of a lemon pie filling containing the present gelling instant starch.

The following ingredients were employed in the indicated amounts:

| | |
|---|---|
| Starch Sample No. 4 | 6.000% |
| Lemon Crystals #7 | 0.700% |
| Water | 64.445% |
| Sugar | 26.000% |
| Liquid Non-Dairy Creamer | 2.000% |
| Egg Yolk Solids | 0.700% |
| Adipic Acid | 0.150% |
| F.D. & C. Yellow #5 | 0.005% |
| | 100.000% |

All dry ingredients were first blended thoroughly. The water and non-dairy creamer were placed in the mixing bowl of a Mixmaster mixer, and the dry mix was added to the liquid while mixing at a low speed (#2) until smooth. The filling thus obtained was placed in a baked pie crust and refrigerated for a minimum of two hours. The resulting pie filling had a satisfactory gel, and its flavor as well as its texture and mouth-feel was good.

In summary, the present invention is seen to provide a modified starch having unique gelling properties when dispersed in cold water without the necessity for conversion of the starch.

Now that the preferred embodiments herein have been described in detail, various modifications and improvements thereon will become readily apparent to those skilled in the art. Accordingly, the present spirit and scope are to be limited only by the appended claims, and not by the foregoing specification.

What is claimed is:

1. A cold-water dispersible, modified potato starch with gelling properties, prepared by drum-drying a potato starch which has been reacted with a crosslinking agent such the the crosslinked starch has a Brabender Viscosity Differential, measured between 80° and 95° C., of from about −35 to +180%, measured at 5% solids using a 700 cm.-g. cartridge, and has a Brabender viscosity at 80° C. of up to about 3100 B.U., measured at 5% solids, or of from about 800 to 1400 B.U., measured at 7% solids using a 700 cm.-g. cartridge, said crosslinked starch after drum-drying being capable of forming a gel having a Bloom strength of at least 60 grams.

2. The modified starch of claim 1 wherein said starch is converted to a water fluidity of up to about 60 prior to the crosslinking step.

3. The modified starch of claim 2 wherein said starch is acid-converted to a water fluidity of 20–50.

4. The modified starch of claim 1 wherein said starch is acid-converted after being crosslinked and before being drum-dried.

5. The modified starch of claim 1 wherein said crosslinking agent is selected from the group consisting of phosphorus oxychloride, epichlorohydrin, sodium trimetaphosphate, and adipic-acetic anhydride.

6. The modified starch of claim 1 wherein said crosslinking agent is phosphorus oxychloride.

7. A process for preparing a cold-water dispersible, modified potato starch with gelling properties comprising the steps of:
   a. reacting a potato starch with a crosslinking agent such that the crosslinked starch has a Brabender Viscosity Differential, measured between 80° and 95° C., of from about −35 to +180%, measured at 5% solids using a 700 cm.-g. cartridge, and has a Brabender viscosity at 80° C. of up to about 3100 B.U., measured at 5% solids, or of from about 800 to 1400 B.U., measured at 7% solids using a 700 cm.-g. cartridge; and
   b. drum-drying the crosslinked starch to obtain said modified starch, said modified starch being defined as capable of forming a gel having a Bloom strength of at least 60 grams.

8. The process of claim 7 wherein said starch is converted to a water fluidity of up to about 60 prior to the crosslinking step.

9. The process of claim 7 wherein said starch is converted after the crosslinking step but prior to the drum-drying step.

10. A food system containing the cold-water dispersible, modified potato starch of claim 1.

* * * * *

UNITED STATES PATENT AND TRADEMARK OFFICE
CERTIFICATE OF CORRECTION

PATENT NO. : 4,228,199
DATED : October 14, 1980
INVENTOR(S) : Chung W. Chiu and Morton W. Rutenberg It is certified that error appears in the above-identified patent and that said Letters Patent are hereby corrected as shown below:

In the names of the Inventors on the front page, "Chung W. Chiu" should read -- Chung-Wai Chiu --.

Signed and Sealed this

Seventeenth Day of February 1981

[SEAL]

Attest:

RENE D. TEGTMEYER

Attesting Officer

Acting Commissioner of Patents and Trademarks